Feb. 24, 1925.
C. S. CHAPMAN
1,527,348
HEATING AND COOKING APPLIANCE
Filed Aug. 18, 1922
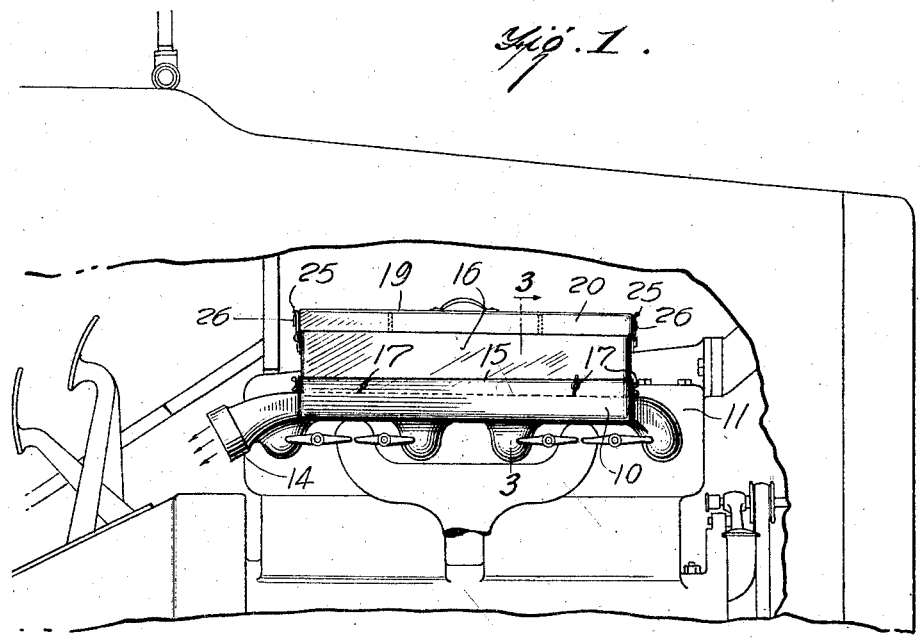
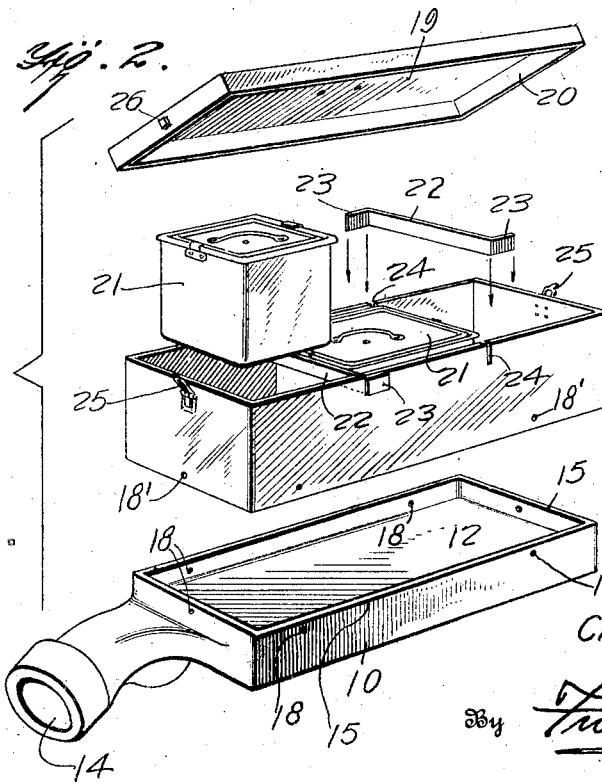
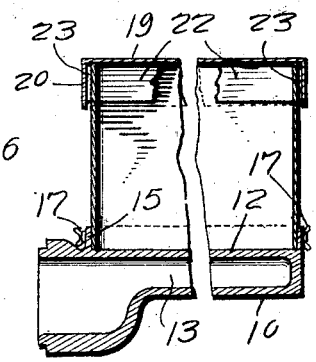
Inventor
CHARLES S. CHAPMAN,
By Franklin H. Hough
Attorney Patented Feb. 24, 1925.

1,527,348

UNITED STATES PATENT OFFICE.

CHARLES S. CHAPMAN, OF RIDGEWOOD, NEW JERSEY.

HEATING AND COOKING APPLIANCE.

Application filed August 18, 1922. Serial No. 582,691.

*To all whom it may concern:*

Be it known that I, CHARLES S. CHAPMAN, a citizen of the United States, residing at Ridgewood, in the county of Bergen and State of New Jersey, have invented certain new and useful Improvements in Heating and Cooking Appliances; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to heating and cooking appliances and has for an object the provision of a device which may be applied to an internal combustion engine of the usual and ordinary type, said appliance to include and comprise a part serving as an exhaust manifold for the engine and employing the heat of such exhaust manifold for heating and cooking purposes.

A further object of the invention is to provide an exhaust manifold having an enlarged chamber into which the exhaust gases from the several cylinders are emitted, such enlargement of chamber serving not only as a means for employing the heat of the gases but, by reason of its shape and relation of the cylinders offering less back pressure to the escape of the exhaust gases and, therefore, adding to the power of the engine.

A further object of the invention is to provide in combination with an exhaust manifold of improved type and shape a container or receptacle employing such exhaust manifold as a bottom with means for maintaining other cooking utensils within said container so that commodities may be cooked within said utensils while the engine is in operation emitting the heated gases, as for instance in an automotive vehicle engine while the vehicle is traveling.

A further object of the invention is to provide an improved type of container for receiving the cooking utensils and maintaining such utensils in their respective positions irrespective of the vibration imparted to the device by reason of the travel of the vehicle.

With these and other objects in view the invention comprises certain novel parts, elements, units, combinations, constructions and functions, as disclosed in the drawings, together with mechanical equivalents thereof as will be hereinafter more fully described and claimed.

In the drawings:

Figure 1 is a view in side elevation of a conventional type of automotive internal combustion engine with the invention applied thereto;

Figure 2 is a perspective view of the several parts of the appliance more or less separated, and Figure 3 is a transverse sectional view on line 3—3 of Figure 1.

Like characters of reference indicate corresponding parts throughout the several views.

The present invention comprises a heating base in the form of a manifold indicated as an entirety at 10 which is applied to an internal combustion engine shown conventionally at 11 as an exhaust manifold. The manifold comprises a plane top 12 extending laterally at one side of the engine and providing a space or chamber 13 therebeneath, extending also laterally from the ports for the introduction of the exhaust gases. The formation of this chamber 13 as a comparatively wide, flat and narrow chamber provides for the initial expansion of the gases in this exhaust manifold after being emitted from the exhaust ports, so that they are discharged into the exhaust line as indicated at 14 in a pre-expanded condition, adding materially to the elimination of noise incident upon the explosion as well as adding to the efficiency and power of the engine.

About or adjacent to the marginal edge of the part 10 a rim or flange 15 is provided, about and secured to which is a housing 16. This housing 16 may be of any approved material but is preferably of sheet metal secured to the flange 15 in any approved manner, as by the thumb bolts or nuts 17 through registering openings 18 and 18'. With the comparatively plane surface 12 of the manifold and the upstanding portions 16 a container is provided completed by a cover 19 having a flange 20.

The container consisting of the housing 16 and cover 19 composes the cooking and heating unit as an entirety. Into this container provision for implacing a plurality of utensils is made, such utensils being indicated at 21, but except in combination forming no part of the present invention, being stock utensils. The housing 16 is preferably of such size and dimensions as to receive a number of such utensils, indicated at Figure 2 as three, but it is to be understood that the number is in no way limited except as the size of the utensils and the size of the exhaust manifold may limit the use. The device being provided for containing a number of these receptacles, it is obvious that at times a lesser number may be desired. For this purpose separating bars 22 are provided having hooked or angularly disposed ends 23 so that when the bars 22 are inserted in slots 24 provided in the upper marginal edge of the housing 16 the angularly disposed ends 23 will bear against the outer surface of such container and under the flange 20 of the cover.

To maintain the cover 19 in position upon the housing and the utensils 21 in position in the housing 16 any approved type of cover fastening member is provided as for instance the latches 25 hinged to the housing 16 and preferably controlled by a spring action in the usual well known manner and adapted to engage lugs 26 on the flanges 20.

It is obvious, of course, that the present invention will find its greatest utility when used by motor tourists making provision for the cooking of meals without interrupting the journey. In use the commodities to be cooked will be placed in the utensils 21 of such number and such variety as the menu may require, the utensil then placed in the container which will be closed. The operation of the engine either during travel or for the purpose if found feasible will, of course, heat the exhaust manifold and the plane bottom 12 of the container heating thereby the utensils and their contents to such a temperature that the contents will be cooked in due time. The cooking being completed the remaining portion of the operation will be perfectly apparent.

What I claim to be new is:

The combination with an internal combustion engine of an exhaust manifold presenting a relatively plane surface, a container carried by said manifold and employing said plane surface as a bottom and comprising relatively thin side walls having registering slits formed in their upper edges upon opposite sides, a bar extending transversely across and having means at its ends for engaging in said slits, and a cover for said housing enclosing the said bars and their fastening means.

In testimony whereof I hereunto affix my signature.

CHARLES S. CHAPMAN.